United States Patent [19]

Walters et al.

[11] Patent Number: 5,012,634
[45] Date of Patent: May 7, 1991

[54] CUTTERBAR GEAR HOUSING DESIGN FOR CONTAINING GEAR LUBRICATION FLUID

[75] Inventors: James C. Walters; Craig A. Richardson; Michael J. Verhulst, all of Ottumwa, Iowa

[73] Assignee: Deere & Company, Moline, Ill.

[21] Appl. No.: 531,604

[22] Filed: Jun. 1, 1990

[51] Int. Cl.$^5$ .............................................. A01D 34/30
[52] U.S. Cl. ..................................................... 56/13.6
[58] Field of Search ....................... 56/12.3, 13.6, 255, 56/295, DIG. 6, DIG. 10; 74/606 R

[56] References Cited

U.S. PATENT DOCUMENTS

| | | | |
|---|---|---|---|
| 1,789,579 | 1/1931 | D'Agostino | 74/606 R |
| 2,743,627 | 5/1956 | Christenson | 74/606 R |
| 3,505,894 | 4/1970 | Halibrand | 74/606 R |
| 3,524,306 | 8/1970 | Reber | 56/12.3 |

FOREIGN PATENT DOCUMENTS 2822686  11/1978  Fed. Rep. of Germany ....... 56/13.6

*Primary Examiner*—William P. Neuder

[57] ABSTRACT

A cutterbar for a rotary mower includes a gear housing containing a series-parallel spur gear train coupled for driving cutting units spaced along the cutterbar. The gear housing, as viewed from an end, defines a cavity which is wedge-shaped in cross section with the deep part of the wedge being located at the rear of the cutterbar. As considered when the cutterbar is leveled from end-to-end and disposed for cutting crop at a relatively high level, a top wall of the cavity extends substantially horizontally and the spur gears contained within the cavity are positioned close to and parallel to the top wall so that a substantial volume is left below the gears for containing lubricant. A plurality of fore-and-aft extending, transversely spaced ribs are formed along a bottom wall of the housing at a level below the gearing whereby the ribs serve to prevent the lubricant from moving quickly towards a lower end of the cutterbar when the latter is working on a slope. Provided in a lower rear location of each rib is an orifice which serves to permit lubricant to drain to the low end of the cutterbar when it is desired to remove the lubricant from the cutterbar by way of an appropriate drain hole. A sight gauge is provided at each end of the housing for viewing the lubricant level for aiding in leveling the cutterbar from end-to-end and then for determining if the lubricant level is that desired.

9 Claims, 4 Drawing Sheets

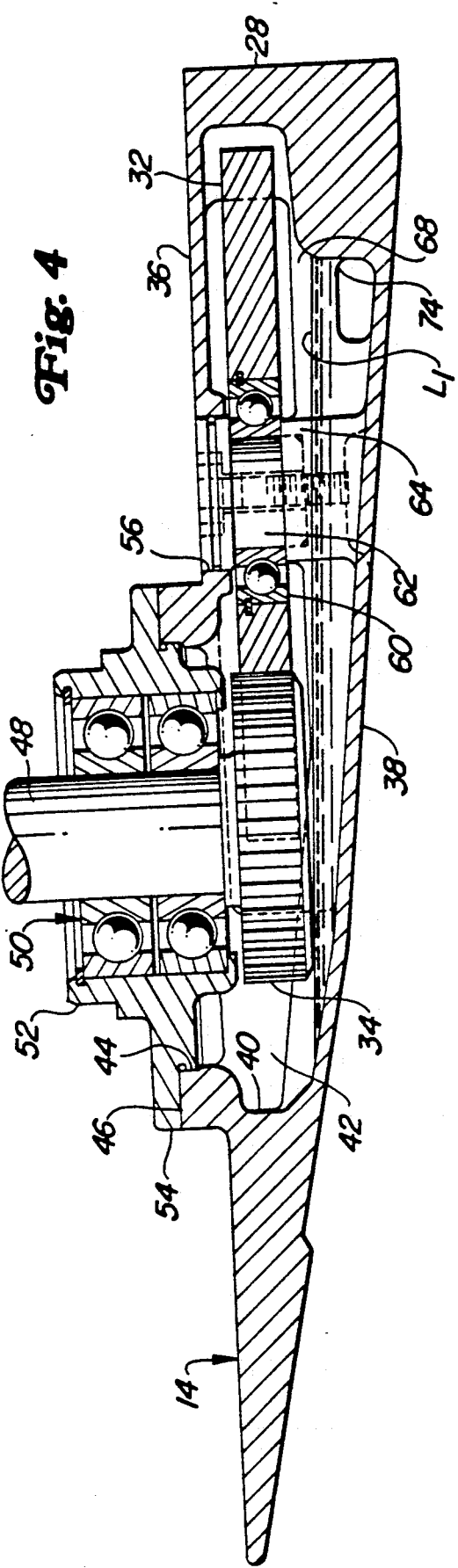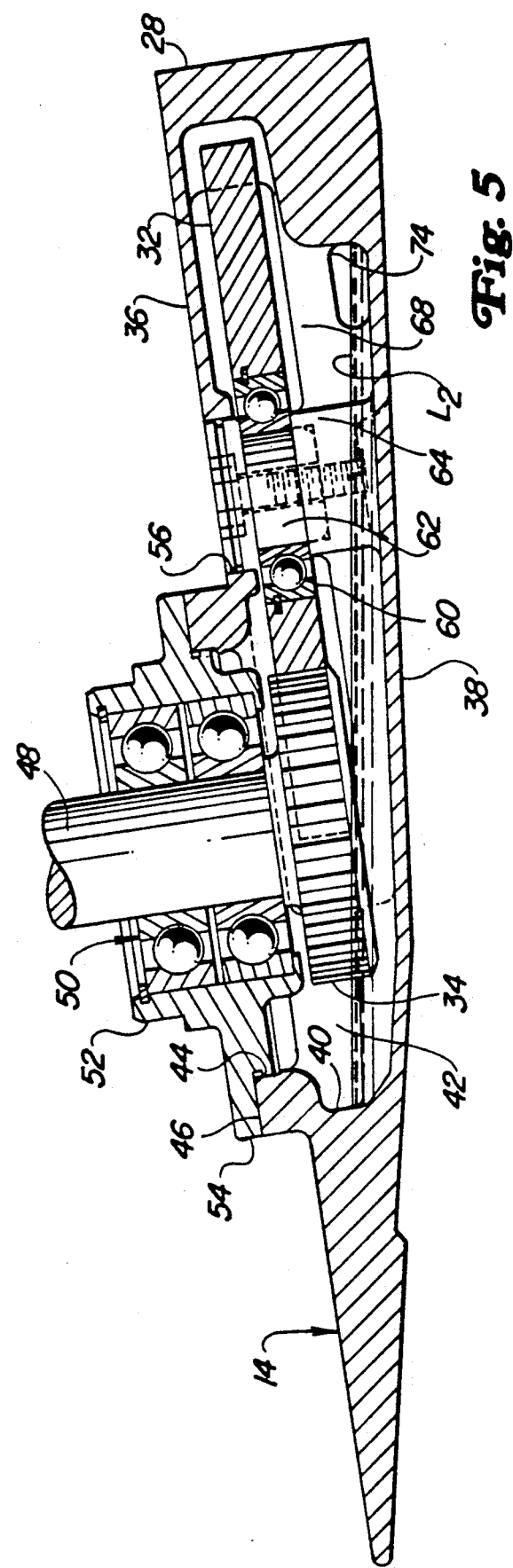

CUTTERBAR GEAR HOUSING DESIGN FOR CONTAINING GEAR LUBRICATION FLUID

ASSIGNMENT

The entire right, title and interest in and to this application and all subject matter disclosed and/or claimed therein, including any and all divisions, continuations, resissues, etc., thereof are, effective as of the date of execution of this application, assigned, transferred, sold and set over by the applicant(s) named herein to Deere & Company, a Delaware corporation having offices at Moline, Ill. 61265, U.S.A., together with all rights to file, and to claim priorities in connection with, corresponding patent applications in any and all foreign countries in the name of Deere & Company or otherwise.

BACKGROUND OF THE INVENTION

The present invention relates to rotary or disc mowers of a type including an elongate cutterbar, and more particularly relates to such a cutterbar including a fluid-tight gear housing adapted for holding lubrication fluid for the gears contained in the housing.

The idea of using a cutterbar drive gear housing as a gear lubrication fluid reservoir is well known in the art. Both underfilling and overfilling the cutterbar with lubricant will result in gear damage, damage through underfilling resulting because of the gears becoming starved for lubrication and running dry; and damage through overfilling resulting because the gears churn and overheat the fluid which causes it to break down and lose its lubricity. Of course, operation of the gears in a bath of lubricating fluid is also not desirable because of the power loss attendant with such operation.

U.S. Pat. No. 4,539,797, granted 10 Sept. 1985, discloses a cutterbar including a housing which is substantially rectangular in cross section and having a depth only slightly greater than that of a series-arranged spur gear train contained therein for driving cutting units carried by the housing. Thus, the volume of the housing which is available for containing lubricant is relatively small which has the disadvantage of making the cutterbar quite sensitive to both underfilling and overfilling of lubricant. Although the patent features a way of detecting whether or not sufficient lubricant is contained in the cutterbar, the method of checking lubricant level is not very convenient or simple since it involves placing the cutterbar on a relatively level area, elevating one end of the cutterbar a predetermined amount and then removing a fill plug from the elevated end to see if the lubricant level is up to the fill plug orifice, such a level of lubricant being an indication of a sufficient amount. While this may be an effective way of determining if enough lubricant is present, it has the disadvantage of not effectively preventing overfilling of the cutterbar since an operator is liable to think that the cutterbar is properly filled if lubricant is present when the fill plug is removed when in fact the cutterbar may be overfilled.

SUMMARY OF THE INVENTION

According to the present invention, there is provided a rotary mower cutterbar constructed so as to overcome the aforementioned disadvantages associated with the prior art.

An object of the invention is to provide a rotary mower having a cutterbar configured for containing a sufficient quantity of lubricating fluid so as to make the cutterbar less sensitive to overfilling while keeping excess fluid away from the gearing.

A further object of the invention is to provide a cutterbar constructed so as to slow the movement of lubricating fluid from one end to the other when operating on a slope so as to limit the time that the gears contained in the lower end will operate immersed in lubricant.

Yet another object of the invention is to provide a way for easily checking the level of lubrication fluid within the cutterbar.

These and other objects are achieved by a cutterbar having a fluid-tight housing which is somewhat wedge-shaped in cross section and contains a series-parallel spur gear drive train with the gearing being disposed such that only a minimal contact with the reservoir of lubrication fluid is made by the gearing when the cutterbar is in a relatively level disposition from end-to-end. Further, the rear portion of the wedge-shaped housing forms a relatively deep section which contains lubricant in such quantity that the cutterbar can be overfilled with fluid without there being any adverse affect resulting therefrom. Furthermore, provided in end plates closing the opposite ends of the cutterbar are relatively large sight gauges that are located in the vicinity of the deep part of the wedge shape for permitting an operator to observe whether or not sufficient lubrication fluid is present in the cutterbar. Also, a plurality of fore-and-aft extending, apertured ribs are provided on the bottom wall of the cutterbar for hindering the rate at which lubrication fluid flows towards the low end of the cutterbar when the latter is operating on a slope.

BRIEF DESCRIPTION OF THE DRAWING

FIG. 4 is an enlarged sectional view taken along line 4—4 of FIG. 1, showing the lubricant level with the cutterbar being shown substantially level from end-to-end but tilted to a maximum height cutting position relative to the ground.

FIG. 5 is a view like that of FIG. 4 but showing the cutterbar tilted to a minimum height cutting position relative to the ground.

DESCRIPTION OF THE PREFERRED EMBODIMENT

Figure 1:
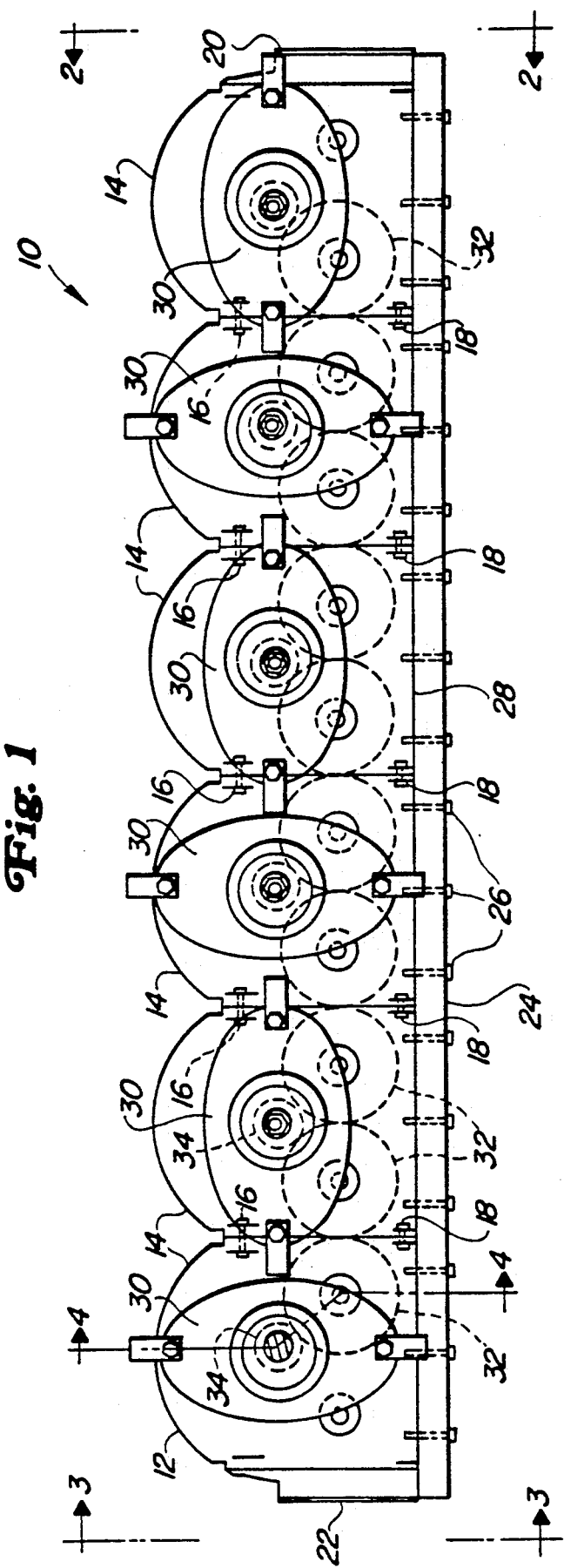
FIG. 1 is a top of a cutterbar constructed in accordance with the principles of the present invention.
Figure 2:
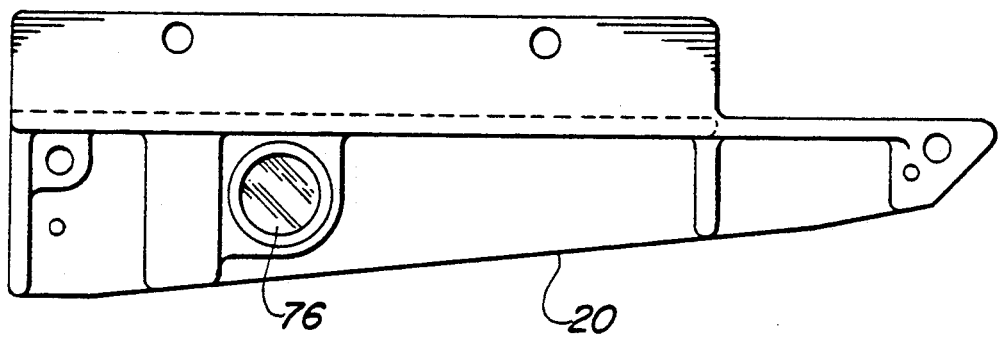
FIG. 2 is a right side elevational view of the right end cap of the cutterbar.
Figure 3:
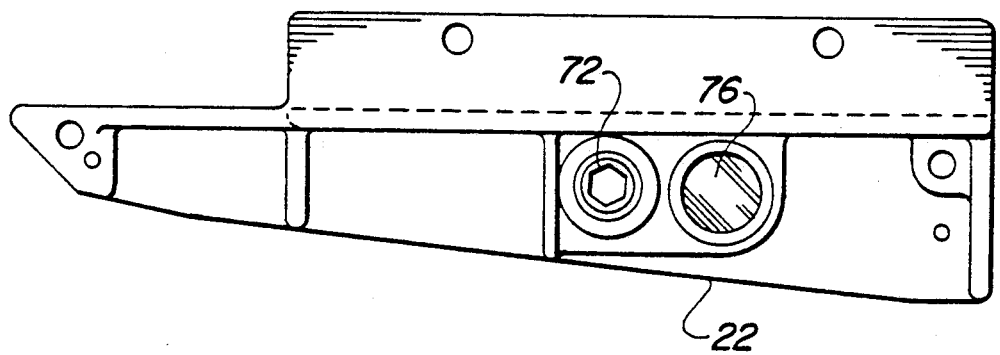
FIG. 3 is a left side elevational view of the left end cap of the cutterbar.
Figure 6:
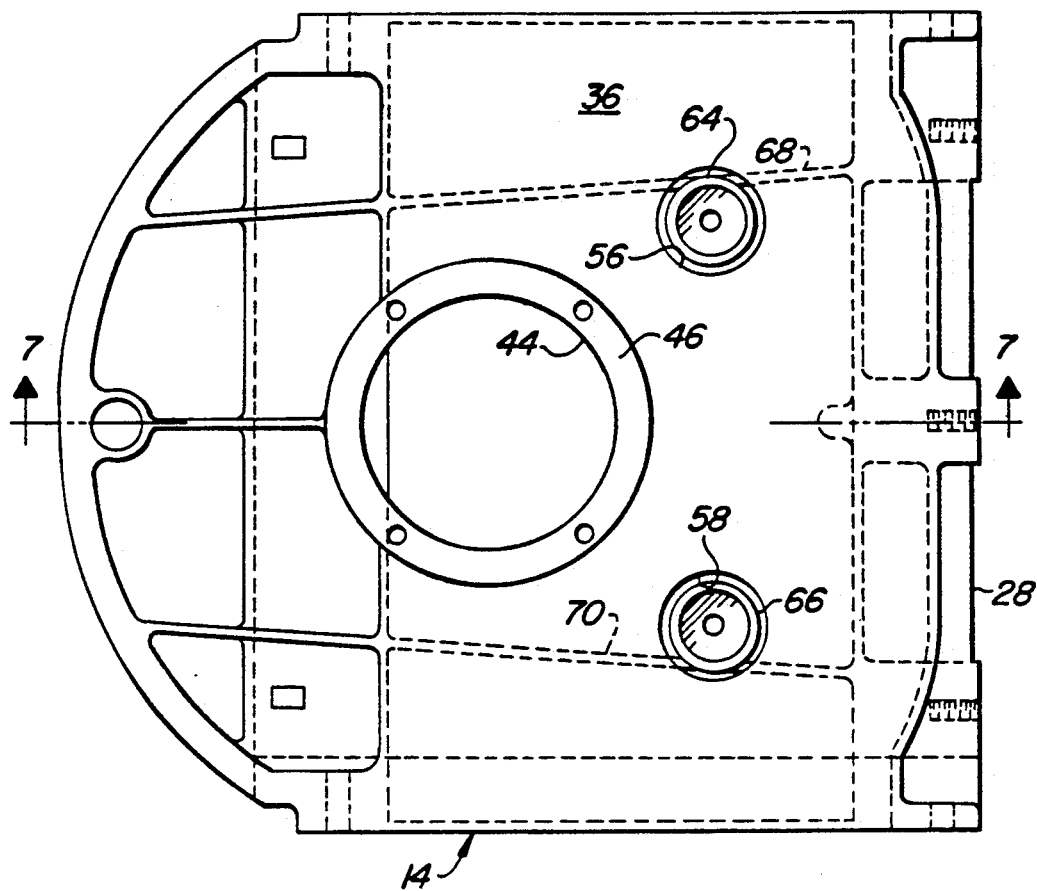
FIG. 6 is a top plan view of a cast housing section of a cutterbar module.
Figure 7:
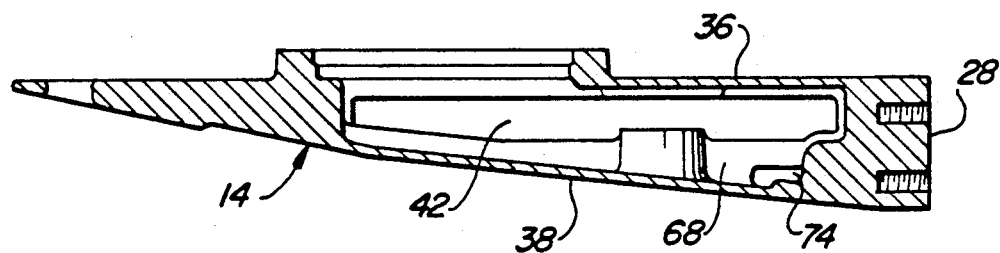
FIG. 7 is a vertical sectional view taken along line 7—7 of FIG. 6.

Referring now to FIGS. 1-3, there is shown a cutterbar 10 for a rotary or disc mower including a gear housing 22 here being shown constructed of a plurality of modules 14, each having opposite ends delimited by planar fore-and-aft extending end faces secured in tight engagement with an adjacent end face of a neighboring housing section by means of front and rear bolts 16 and 18, respectively. Right and left end caps 20 and 22 are respectively secured to the right and left end faces of the right- and leftmost ones of the modules 14. The modules 14 each include a cast housing section 23 with the sections being interconnected by a transverse tubular stiffener beam 24 of rectangular cross section that extends behind and is secured, as by cap screws 26, to an upright planar rear wall 28 of each of the housing sections. Each of the modules 14 further includes a rotary cutter unit 30 removably mounted to a central location of the housing section 23 thereof for being driven by a series-parallel spur gear drive train composed of a continuous train of series arranged idler gears 32 and cutter unit drive pinions 34 arranged in parallel relative to the idler gears 32 and being meshed with selected ones of the idler gears in accordance with the desired direction of rotation of the cutting unit.

As viewed in FIG. 4-7, it can be seen that each housing section 23 is wedge-shaped in vertical cross section and includes a generally horizontal top wall 36 and a bottom wall 38 which converge forwardly from the rear wall 28 to a forward wall 40 so as to define a cavity 42 which is generally wedge-shaped in vertical cross section whereby the interior of the gear housing 12 is likewise generally wedge-shaped in cross section. The top wall 36 is provided with a centrally located circular opening 44 which leads into the forward end of the cavity 42 and is bounded by an upwardly facing annular mounting surface 46. Each pinion 34 is formed at the lower end of a drive spindle 48 rotatably mounted in a bearing assembly 50 carried by a bearing housing 52 having an annular flange 54 that is removably secured against the mounting surface 46 whereby the bearing housing, bearing assembly and spindle form part of the cutting unit 30 and close the opening 44. Provided in the top wall 36 rearwardly of and spaced equidistant from the opening 44 are right and left circular openings 56 and 58. Except for the right- and leftmost modules 14 which have only one of the idler gears 32 mounted in the housing sections 23 thereof, each of the modules carries a pair of the idler gears 32, the latter being rotatably mounted, as by respective bearings 60, to stub shafts 62 having enlarged upper ends sealingly received in the circular openings 56 and 58 and lower ends received in cylindrical receptacles 64 and 66 formed integrally with the bottom wall 38 respectively in axial alignment with the openings 56 and 58. The idler gears 32 are thus located in a rear portion of the cavity 40 and are disposed in adjacent parallel relationship to the top wall 36 thus leaving a considerable space below the idler gears which serves as a lubricant reservoir. It is here noted, that since the bearing assemblies 50 are elevated a considerable distance above the lubricant reservoir, they are preferrably made up of lubricated and sealed bearings and require no further lubrication.

When the cutterbar 10 in its position shown in FIG. 4, wherein the cutterbar is angled at two degrees from the horizontal, the lubricant is at a level L1 which passes well below the idler gears 32 and slightly below the pinions 34. The distance between lubricant level L1 and the pinions 34 is such that normal roughness or unevenness in the terrain will result in lubricant splashing or flowing into contact with at least some of the pinions 34 which then act to move lubricant to the idlers 32 as the pinions rotate.

When the cutterbar 10 is in its position shown in FIG. 5, wherein the cutterbar is angled at eight degrees from the horizontal, the lubricant is at a level L2 which still passes below the idler gears 32 but immerses a lower front portion of each of the pinions 34. Again, the pinions 34 act to deliver lubricant to the idlers 32.

The module housing sections 23 are each provided with right and left upstanding ribs 68 and 70 which are formed on the bottom wall 38 and extend fore-and-aft between the front and rear ends of the cavity 42, the ribs being spaced and oriented such that they converge slightly forwardly and respectively pass adjacent outer surfaces of the receptacles 64 and 66. The ribs 68 and 70 serve to prevent lubricant from moving quickly from one end to the other of the cutterbar housing 12 when the cutterbar 10 is operating on a slope, whereby the time that end elements of the gearing operate immersed in the lubricant is minimized. A drain plug 72 is provided in the left end cap 22 and the ribs 68 and 70 each contain an orifice 74 located in a lower rear location thereof for permitting lubricant to flow through the ribs to the left end of the cutterbar so as to permit lubricant to be drained from the cutterbar when desired, the orifices being small enough so as not to defeat the purpose of the ribs in preventing quick movement of lubricant towards the low end of the cutterbar.

The lubricant level in the cutterbar 12 can be quickly checked by looking through respective circular sight gauges 76 provided in the right and left end caps 20 and 22 at rearward locations for viewing the deepest portion of the wedge-shaped housing interior. The gauges 76 are provided with appropriate indicia (not shown) for indicating the level of the lubricant in the cutterbar when the latter is leveled from end-to-end after first being placed in its maximum height cutting position shown in FIG. 4, such end-to-end leveling being done with the aid of the sight gauges.

Thus, it will be appreciated that the cutterbar 12 is particularly designed so as to hold lubricant in such quantity as to make the over- of underfilling thereof with lubricant less sensitive than would be the case if the lubricant containing reservoir were small and that the ribs 68 and 70 act to lessen the possibility that gears carried in the lower end of the cutterbar when the latter is operating on a slope would operate immersed in lubricant for an extended time. Furthermore, it will be appreciated that the large reservoir for containing lubricant makes it possible to use large sight gauges for aiding in the leveling of the cutterbar and for determining the correct level of lubricant in the cutterbar.

We claim:

1. In a cutterbar of a rotary mower including a plurality of cutter units mounted in spaced relationship along the length of the cutterbar and coupled for being driven by a spur gear train contained within a fluid tight gear housing defined by the cutterbar, the improvement comprising: said gear housing, when in its highest cutting position, including a top wall which is generally horizontal and a bottom wall which converges forwardly throughout its length toward the top wall from a generally upright rear wall such that the housing has a generally wedge shaped interior with the thickest dimension of the interior being towards the rear of the interior; and said gear train being disposed adjacent said top wall and thereby establishing a relatively large void in said interior below said gear train for serving as a lubricant reservoir.

2. The cutterbar defined in claim 1 and further including a plurality of fore-and-aft extending, transversely spaced ribs provided on said bottom wall beneath said gear train for serving as dams which prevent lubricant contained in the reservoir from quickly running towards a low end of the cutterbar when the latter is operating on a slope.

3. The cutterbar defined in claim 2 wherein at least one end of the cutterbar is provided with a drain plug; and each of said ribs being provided with an aperture located at a lower rear location thereof, whereby lubricant may be drained from the cutterbar by raising one end and removing the drain plug from the lower end.

4. The cutterbar defined in claim 1 wherein opposite ends of the cutterbar are each provided with a sight gauge located such that, when the cutterbar is leveled from end-to-end and tilted to its highest cutting attitude, the sight gauges will indicate the level of lubricant in the reservoir.

5. The cutterbar defined in claim 1 wherein the gearing is so located relative to a full level of lubricant in the cutterbar housing that the full level passes beneath the gearing when the cutterbar is leveled from end-to-end.

6. A cutterbar for a rotary mower comprising: said cutterbar including a gear housing defining a cavity which is generally wedge-shaped in vertical, fore-and-aft cross section with the deepest part of the cavity being at the rear of the housing; said housing being defined in part by a top wall which is generally horizontal when the cutterbar is leveled from end-to-end and in a tilted position for effecting its highest cut; a spur gear train being located in the housing and including a plurality of gears arranged parallel to and in close proximity to the top wall and being arranged in series across a rear portion of the cavity, and a plurality of pinions being arranged in parallel to and in proximity to the top wall and being arranged across a forward portion of the cavity in parallel to the plurality of gears and being respectively meshed with selected ones thereof depending on the desired rotation of the associated pinion; and said cavity being oriented, when the cutterbar is disposed as described above, such that it is adapted to hold lubricant having a full level which passes beneath the gearing when the cavity is properly filled with lubricant.

7. The cutterbar defined in claim 6 wherein each of opposite ends of the cutterbar is provided with a sight gauge sized such that it is located adjacent and extends a full depth dimension of a rear portion of the cavity, whereby the sight gauges can be viewed for end-to-end leveling of the cutterbar and for observing the lubricant level.

8. The cutterbar defined in claim 7 wherein the housing further includes a bottom wall provided with a plurality of ribs spaced along the length of the cutterbar and extending fore-and-aft below the gearing so as to control the rate of flow of lubricant towards a low end of the cutterbar when the latter is operating on a slope.

9. The cutterbar defined in claim 8 wherein each of the ribs is provided with at least one aperture located for permitting lubricant in the cutterbar to drain towards a lowered end thereof; and a drain plug being provided at said lowered end.

* * * * *